Dec. 16, 1969      A. C. PETERSON      3,484,059

VARIABLE SUSTENTATION SYSTEMS FOR AIRCRAFT

Filed June 17, 1966      3 Sheets-Sheet 1

INVENTOR.

Adolphe C. Peterson

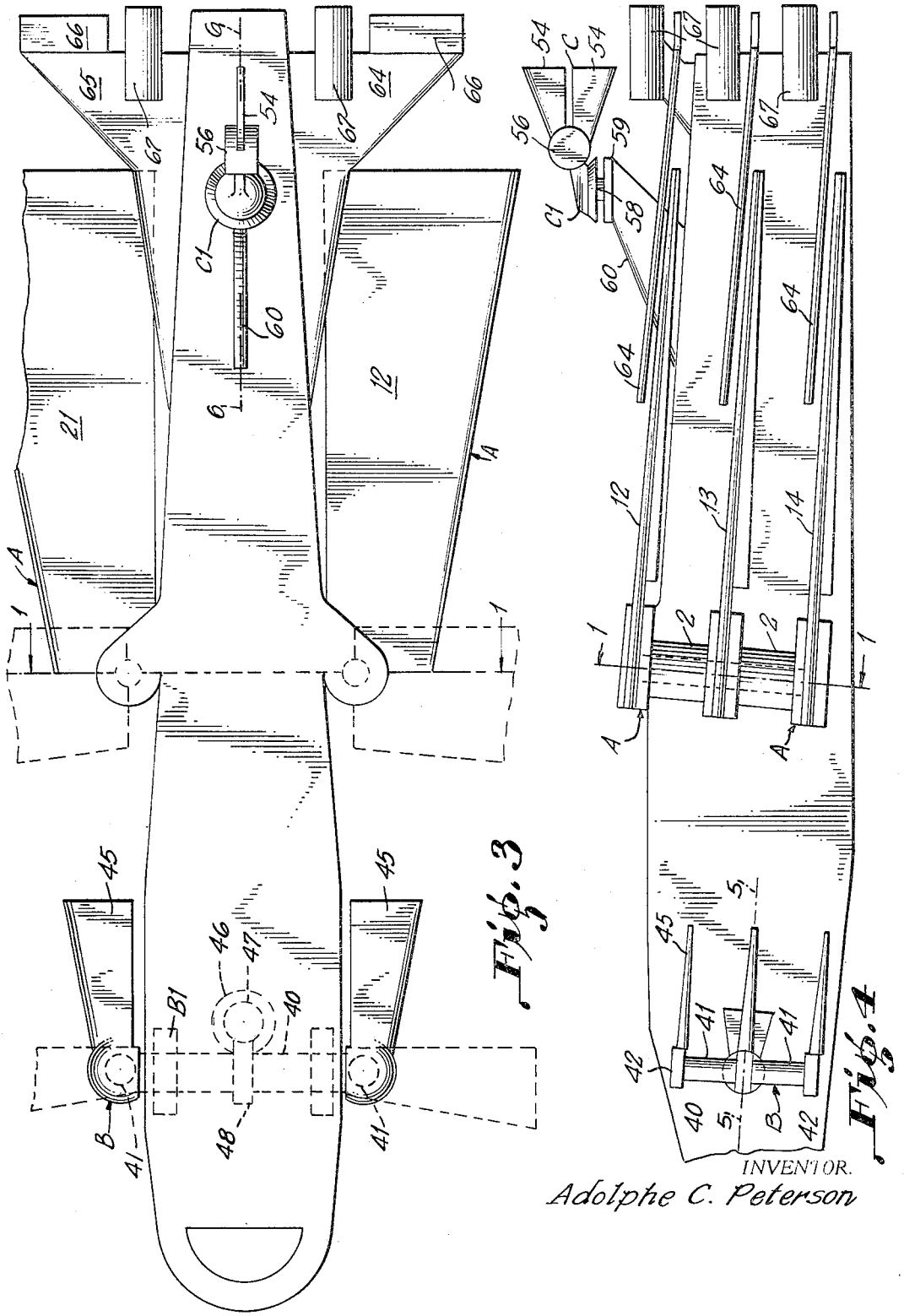

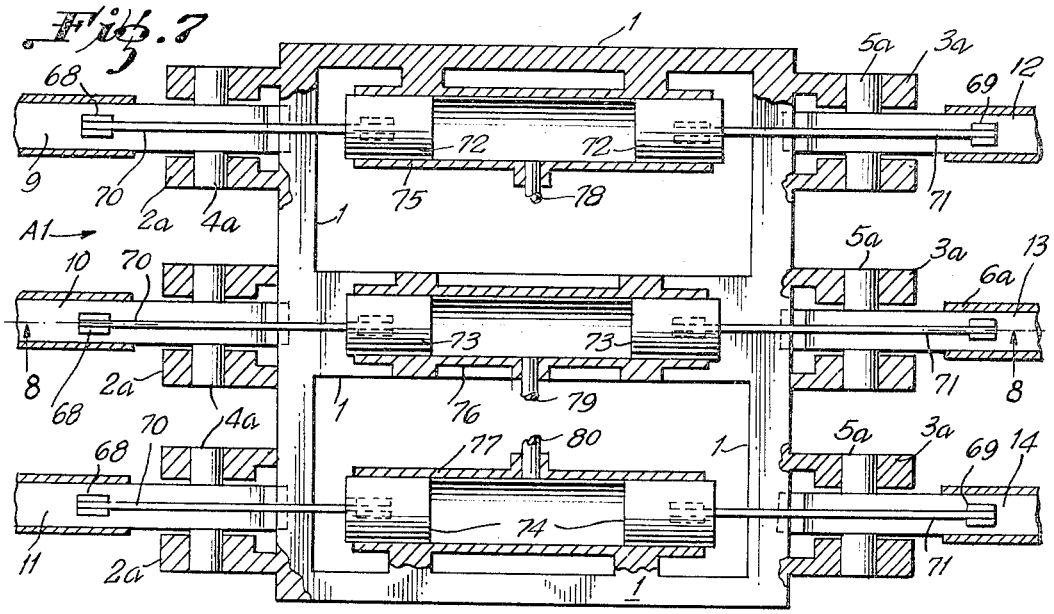
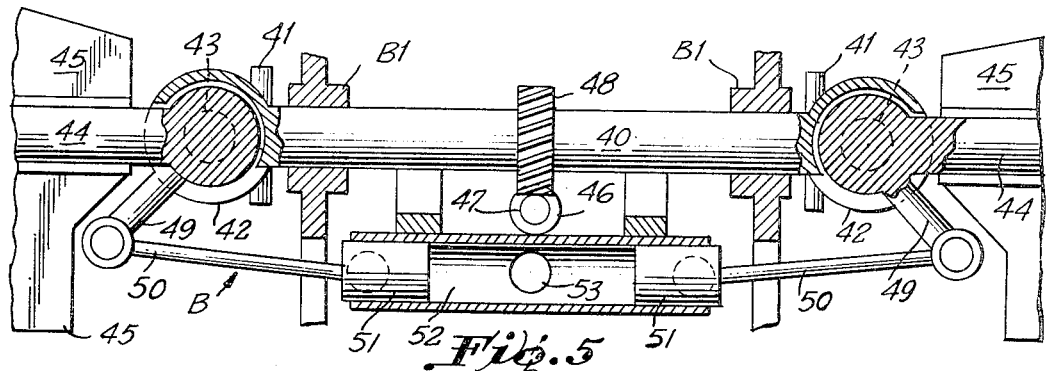
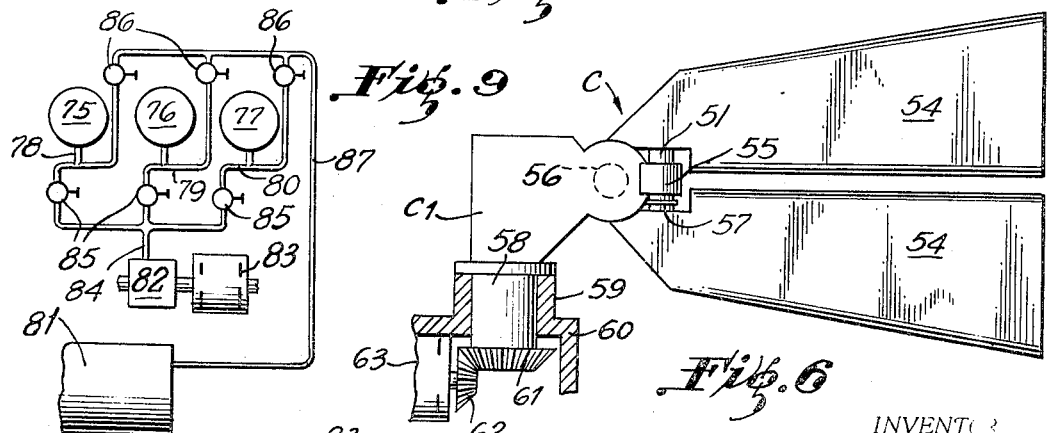
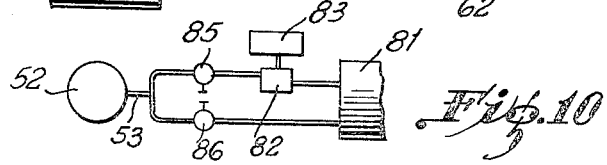
INVENTOR
Adolphe C. Peterson

United States Patent Office 3,484,059
Patented Dec. 16, 1969

3,484,059
VARIABLE SUSTENTATION SYSTEMS FOR AIRCRAFT
Adolphe C. Peterson, 4623 Bruce Ave. S., Minneapolis, Minn. 55424
Filed June 17, 1966, Ser. No. 558,460
Int. Cl. B64c 3/38
U.S. Cl. 244—46       12 Claims

ABSTRACT OF THE DISCLOSURE

A variable geometry aircraft has a plurality of vertically super-imposed space apart wing surfaces providing sustentation and also has shaft and bearing means for mounting the wings to the fuselage. The aircraft includes power and transmission means for rotating the wing surfaces in unison. The aircraft also includes rotatable control surfaces similar in design to the sustaining wings.

---

My invention relates to aircraft and particularly to a system for flight which is variable in sustentation and it is therefore called Variable Sustentation Systems for Aircraft.

The principal objects of my invention are to provide an aircraft which may have high travel or cruising speed and which may at the same time by adjustment in flight have such relatively low speed when that is desired that it may be landed with comparative ease and lack of danger. An especial object is to provide a form of wing sustentation and adjustment of such sustentation means, for use on land or in flight, as will provide the ease in adjustment of the wing or sustentation means, in that type of aircraft which is especially suited for the higher speeds of travel, especially such speeds as are commonly called supersonic or near sonic speed. The object is especially to provide a form of sustentation means which may have high utility in warfare especially for that type of aircraft which are called bomber aircraft, while being also adaptable for use in other types of defense craft such as fighter craft and reconnaisance aircraft. An especial object is also to provide sustentation means which is particularly useful in the very high speed commercial type of aircraft whether for the carriage of passengers or cargo.

This invention is especially an improvement over that type of aircraft which is disclosed in this applicant's patent identified as Variable Speed Aircraft having adjustable swept back wings, issued July 13, 1954, Patent No. 2,683,574. This invention provides an improvement in the general concept of the variable speed aircraft and provides also a means of utilization of variable speed sustentation in a manner whereby the aircraft of very large weight and power and carrying capacity may be constructed to have variable sustentation for VTOL or STOL flight use while at the same time being not of unduly great weight in proportion to cargo capacity or passenger capacity and whereby the sustentation means may be constructed to have greater strength in proportion to its weight, and so that the result will be a high speed or supersonic speed aircraft having greater safety in flight because of greater strength. Supersonic speed aircraft as presently contemplated and designed are very costly in design and manufacture and structure and this invention is contemplated to enable construction of such aircraft at lesser cost, both of design and manufacture, than such designs as are or have been developed or designed.

Another object is to provide systems of overall design of airfoil means, both for sustentation and for balance of the aircraft and for horizontal and elevational control of the aircraft and for stability which is especially adapted for variable speed aircraft and which result in better efficiency of such devices and accordingly better control and stability of such aircraft.

The principal devices and combinations of devices comprising my invention are as illustrated and described in the accompanying drawings and in the specification hereinafter following wherein my invention is illustrated in several different forms. Like characters refer to like parts throughout the several views in so far as is practicable.

Referring to the drawings:

FIGURE 1 illustates one form of operating means and its association with structural units of an aircraft and is a view partly in side elevation looking from rearwardly of the aircraft and partly in section on the line 1—1 of FIGURE 2 some parts broken away, some parts being shown in the background.

FIGURE 3 is a plan view of an aircraft, shown diagrammatically, this view being much reduced in size as compared with FIGURES 1 and 2, this view showing the unit illustrated in FIGURES 1, 2, as unit A.

FIGURE 4 is a view in side elevation of the aircraft as shown in FIGURE 3, this view being approximately on the same scale as to comparative size as that of FIGURE 3, the unit A being similarly designated.

FIGURE 5 is a view, partly plan and partly cross sectional, showing detail construction of the unit which is designated as B in FIGURES 3 and 4, the cross section being on the line 5—5 of FIGURE 4.

FIGURE 6 is a view partly in side elevation and partly in cross section on the line 6—6 of FIGURE 3, this being a detail construction view of the unit C as designated in FIGURES 3 and 4.

FIGURES 7 and 8 are views of a modified form of the unit designated as A in FIGURES 3 and 4.

FIGURE 9 is a diagrammatic view showing the servomotor system or circuit by which the modified unit system as shown in FIGURES 7 and 8 is controlled in its wing variation system.

FIGURE 10 shows a diagrammatic representation of fluid pressure control for either of units B or C.

The system of sustentation as illustrated and which is disclosed, and likewise the system of control, as disclosed in this invention, are intended and contemplated to be useful in aircraft of large or small capacity and power, but the system is contemplated to be primarily for incorporation in such aircraft as commercial aircraft and defense aircraft and wherein it is contemplated that the travel or cruising speeds will be of the near-sonic or even the very high supersonic speed aircrafts, such as are intended to travel commonly at speeds of near 2000 miles per hour or more, and such as will be adapted by their systems to have the lower speeds which are suitable for take-off and landing, whether on land, sea-water or aircraft carriers.

Figure 1:
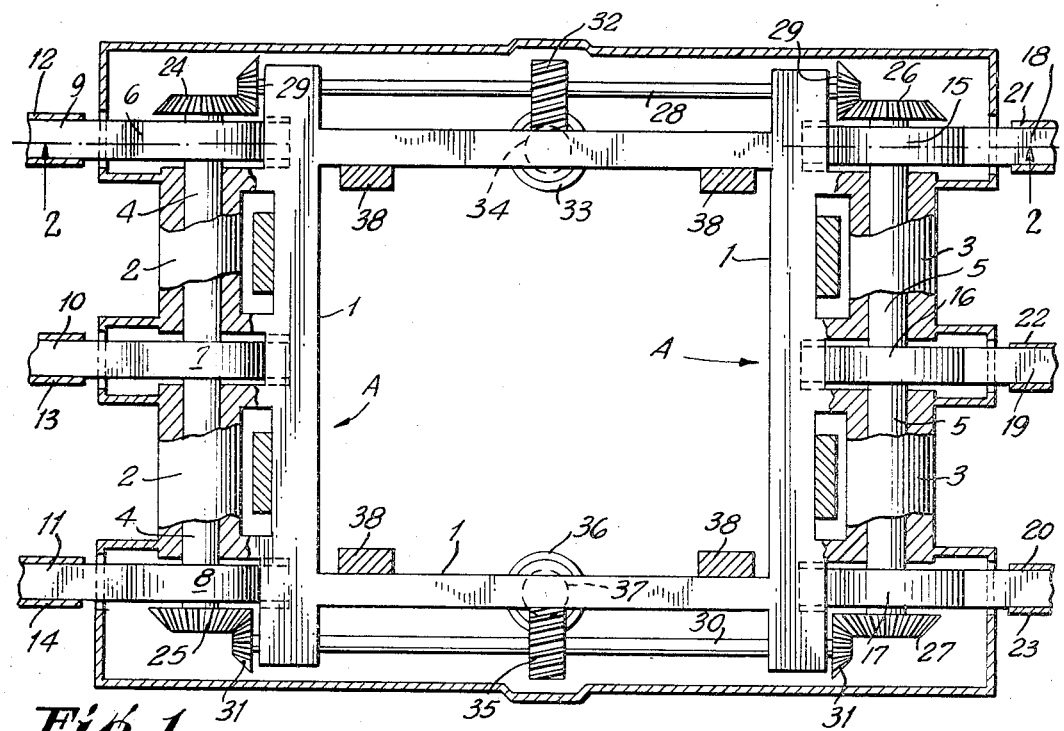
Figure 2:
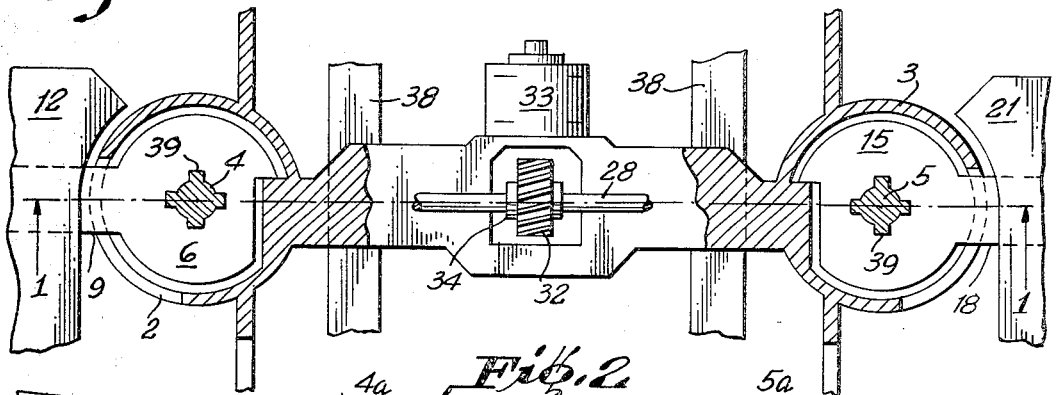
FIGURE 2 is a view partly in section on the line 2—2 of FIGURE 1 and partly in plan view, this view being a view of the operating unit without illustration or view of any necessary covering parts of the aircraft fuselage.

Referring now principally to the FIGURES 1 and 2 where there are shown the operating features or elements of the unit designated as A in FIGURES 3 and 4, the numeral 1 designates generally a rectangular frame, otherwise denoted a yoke, which has formed and firmly secured to it in any manner, bearings 2 (two in number) on one side of the yoke unit, and bearings 3 (two in number) on the other side of the yoke unit. The bearings designated are formed generally in the plane of the yoke two at one end and two at the other end. The bearings 2 are axially aligned and rotationally support in them to be capable of rotation within predetermined limits a so-called wing support pivot 4 and the bearings 3 are axially aligned and rotationally support in them to be capable of rotation within predetermined limits a wing support pivot 5. The wing support pivot 4 has mounted on it three wing spar hubs 6, 7, and 8, and each of these has attached to it or formed with it a long wing spar, which spars are designated 9, 10, and 11, respectively, and each of these has mounted on it a wing skin or sheath, these being designated 12, 13, 14, respectively, these being formed somewhat as customarily formed in aircraft, that is so that they will adequately perform the task as sustentation wings in flight.

The wing support pivot 5 has mounted on it three wing spar hubs 15, 16, 17, respectively, and each of these has attached to it or formed with it a long wing spar, which spars are designated 18, 19, 20 respectively and each of these has mounted on it a wing skin or sheath, these being designated 21, 22, 23, respectively, these being also formed as such sustentation means are generally formed so that they will adequately and substantially equally as the first named wings, perform the task as sustentation means in flight.

The wing support pivots 4 and 5 each have at each of their ends bevel gears, those on pivots 4 being designated 24 and 25 and those on pivot 5 being designated 26 and 27. The bevel gears at the top ends of the pivots are rotationally in connection with shaft 28 by small bevel gears, each designated 29 and the bevel gears at the lower ends of pivots 4 and 5 are rotationally in connection with shaft 30 by small bevel gears, each designated 31. Shaft 28 has fixed on it worm wheel 32 which is driven in either direction by reversible motor 33 through the worm gear 34. Shaft 30 has fixed on it worm wheel 35 which is driven in either direction by reversible motor 36 through the worm gear 37. The shafts 30 and 38 are rotatably mounted as shown in bearings formed on the upper and lower ends of the yoke 1. The electric (or other) motors will be controlled by any form of control means as usually used with motor devices, so that these motors may at any time be controlled to have limited rotations in either direction, and so as to locate wing spars and their sheath surfaces at any location as hereinafter described, the motors being so cooperative as to rotation that each gives driving action or impulse in the same direction of rotation of the pivots 4 and 5, so as to place the wings in the trailing positions or in the wide-spread radially widely separated positions as hereinafter more definitely described. The worm gears and worm wheels described have such slight angular formulation that they will act to restrain the pivots 4 and 5 from relative oscillation, as to the fuselage, except as controlled by the operating electric current directed to the electric motors.

The yoke 1 is fixed in the aircraft, that is to the fuselage, by the beams 38, these being part of the fuselage or aircraft body frame structure. The yoke 1 is so fixed and stationed relatively in the aircraft structure, that the axes of the pivots 4 and 5 are in a plane which is transversely of the aircraft fuselage and is at a slight angle to and is nearly perpendicular to the horizontal longitudinal plane of the aircraft, that is, the longitudinal direction of translational flight of the aircraft, and these axes are thus similarly axially inclined to be slightly rearwardly at their top ends as related to the said direction of flight. This angle may be say fifteen degrees more or less, as is determined to be that for most efficient flight in the high speed flight condition, that is wing formation. The wing surfaces, that is wing skin, will be formed and secured on the wing spars in such manner that wing incidence angle and shape at any phase of wing sweep formation is such as to perform the dynamic air lift sustentation function in the most efficient manner.

The wing spars and their spar hubs are fixed to the pivots 4 and 5 by the lobes 39 of the pivots 4 or 5, these lobes being formed in any manner so that they will engage the wing hubs so that rotation of pivots 4 or 5 with their wing spars and wing surfaces will be similar, that is in the same degree of rotation and with similarity in direction of rotation, the pivots 4 and 5, at any one time, moving in opposite directions of rotation.

Referring now to the flight control air foil means, one of which is designated B, this being a horizontal directional or elevational means, and the other which is designated C, this being a horizontal rudder control means, these control units are generally, each a unit, of the general nature of that of the unit A, above described, that is each has a pair of airfoils which may be placed in relatively trailing positions or in widely separated divergent locations, relatively as to each other.

The unit B is shown in plan view in FIGURE 3 (partly in dotted lines) and is more particularly shown in FIGURE 5, and it is mounted by an oscillative shaft 40 in bearings 31 formed in the fuselage structure or general aircraft structure, and it has at each end of shaft 40 vertical cross beams each designated 41 and each of these beams 41 has three pivot bearings each designated 42, and each of the beams has mounted rotationally thereby one pivot, each designated 43, each of which has formed or fixed therewith extending at right angles (substantially) to its axis, three spars 44, each of the latter having fixed thereon and carried thereby the airfoil skin or sheath 45, the latter forming the control airfoil. Thus there are three control airfoils 44-45 at each end of oscillative shaft 40 and all of these may be subject and have their locations oscillative to a small degree by the oscillation of shaft 40 this being procured and controlled, as may be necessary for elevational direction of the aircraft by an electric motor 46 (FIG. 3) as that motor may be controlled through current flow thereto by pilot or automatic control means (not shown). The electric motor 46 may drive the shaft 40 in either direction rotationally (for oscillation) through the worm gear 47 and the worm wheel 48 (FIGS. 3 and 5). The pivots 43 have cranks 49 affixed thereto and these are by connecting rods 50 connected with pistons 51, one pair of which oppositely reciprocate, as necessary, in a cylinder 52 in accordance with the flow of control fluid (gaseous or liquid) received or ejected by the fluid conduit 53 as the fluid may be supplied as hereinafter described. The pivots 43, one mounted in each cross beam 41, extend through the pivot bearings of the three airfoil spars at each end of shaft 40 so that all three airfoils at each end of shaft 40 (outside of the fuselage) are controlled for their oscillation sweep by the pistons of the one cylinder 52, the airfoils of the unit B thus having the control oscillation as one unit.

The unit C is shown in plan view in FIGURE 3, in side elevation in FIGURE 4 and in enlarged detail with cross section through its rudder axis in FIGURE 6. This unit C is the aircraft rudder means for directional control of the aircraft in flight in the horizontal plane and it is subject to change for high speed or low speed flight by control of oscillation of the pair of airfoils 54 (two) by the fluid pressure unit designated 55, this being enabled by fluid pressure in unit 55 to extend pistons 57, oppositely, and thereby force the pair of airfoils 54 in opposite oscillative direction about the pivot 56 in the vertical rudder shaft bracket 51 which latter is fixed on vertical shaft 58 to be oscillative for horizontal rudder direction in the bearing 59 which has a substantially vertical axis in fuselage stability fin member 60 (FIGS. 3 and 4), and the vertical shaft 58 has affixed bevel gear 61 engaged by smaller bevel gear 62 and controlled by electric (or other) motor 63, the latter being under a pilot's control by any electric current supply means, the motor 63 being a reversible motor means.

At the rearward end of the fuselage structure there are relatively small delta-shaped wings 64 and 65 fixed one on each lateral side of the fuselage structure, and these fixed wings act not only as small capacity sustentation wings but also as stabilizing wings for the aircraft.

Ailerons 66 may be attached to the fixed wings 64–65 at their rearward ends and these are subject to control about horizontal axis pivots (not shown) and by any operative control means (not shown), such means being such as is customarily used for the purpose in aircraft. Propulsion engines 67 are mounted on the fuselage structure at the rearward end thereof, these being located three in one vertical plane on one side and three in the vertical plane on the opposite side of the fuselage and these engines may be of the turbine jet type or some may be of that type and some may be rocket type engines, if that be desired in any construction.

Having described the construction in its general features and elements, the operation and use is now generally described. It is contemplated that the propulsion engines 67 will be supplied with fuel in any manner, as is customary, and that the aircraft will be prepared for take-off on a suitable landing field or airport. The pilot will first, by means of the electric current control as is provided, place all the airfoils, that is all of each of the units A and B and C, in the laterally extended or wide angle positions, that is so that each of all of these airfoils is swung on the pivot axis of the airfoil to its position extended most remotely from the mated airfoil of its pair. This will be in the case of unit A, that each airfoil on each side of the fuselage will extend to a position at right angles to or nearly at right angles to the longitudinal axis of the aircraft fuselage (direction of flight) so that each of the pairs of airfoils of unit A (three pairs) will have that widely extended position so that its greatest effectiveness for sustentation will be attained. The airfoils of unit B will also be similarly extended for greatest ability in sustentation. The airfoils of unit C will be similarly extended to their widest angle relative to the two of the pair as shown but in the case of this unit C the airfoils of the pair C will be swung about their axis of oscillation in the vertical plane, the airfoils of unit C being, in this extended position, extended upwardly as to one and downwardly as to the other from their common pivot axis 56. In this extended position this unit C will offer to ambient air the greatest effectiveness of its surface so that the rudder control effect will be greater in slow speed flight on take-off.

Having so extended all the airfoils from their pivots, the pilot will, by his control of the propulsion engines, enable them to give their greatest or near greatest propulsion impulse or thrust and the aircraft may then take-off from the airport. The pilot may in this take-off flight increase the angle of incidence of the airfoils of unit B so that the aircraft may then assume the position or direction in flight for the necessary elevation of the aircraft, this being done by motor 46.

When the aircraft has attained the necessary altitude, and also a necessary or suitable high speed, the pilot may then utilize the same controls of the airfoils of all the units A and B and C, to place each of the airfoils of each pair of airfoils (units A, B, C) to place all of such airfoils in the trailing positions, where they will be effective to give sufficient sustentation effect at such speeds as are then attained, namely such speeds as one thousand or two thousand miles per hour or even greater speed than that.

In either condition of flight the pilot may use the electric motor 46 to control the incidence position of unit B as may be necessary and also to control rudder unit C he may use the electric control of motor 63 of unit C, and he may use the aeleron control as may be necessary and customary.

In all control of unit A the electric motors 33 and 36 will operate through the bevel gears and the pivot shafts 4 and 5, to turn all the air foil spars 9, 10, 11 and 15, 16, 17 in the same degree of rotation, but so that the pivot shafts and spars on opposite sides of the aircraft's longitudinal axis rotate in opposite directions and so that thus all airfoils of the unit A are simultaneously moved in the same degree of rotation and in the similar movement, that is for the widening of the extension of the wings of wing units or for the reducing of the degree of angularity as to the longitudinal direction of flight of the fuselage. Thus either condition of sustentation may be attained through the control by the pilot of the electric motors which locate the airfoils of the unit A, and the same relative position and parallel vertically superimposed condition of the airfoils on either side of the fuselage will be retained in any of such movement for control. The control and movement in unison and similarity of degree of movement of the airfoils of unit B will also be attained in their control, and likewise the same unison of movement and degree of separation and angularity of the airfoils of the unit C, the rudder unit, will also be retained in the control of this unit C.

The means as described and method of control and movement of all airfoils results in this, that the aircraft will be maintained in either type of flight, slow or supersonic speeds, subsonic or high speed flight; that is in one condition of flight, that for takeoff or landing or hovering, airfoils for sustentation and airfoils for the stability control and directional control are all maintained in the wide angle or divergently extended positions for greatest effectiveness; and for the other condition of flight, that for very high speed or flight at supersonic speed, the airfoils for sustentation and control and direction will all be maintained in the low angle or trailing positions so that then all such airfoils will be in the positions of sufficient sustentation and directional control at the very high speeds while imposing the least necessary retarding effect in such very high speed flight.

Figure 8:
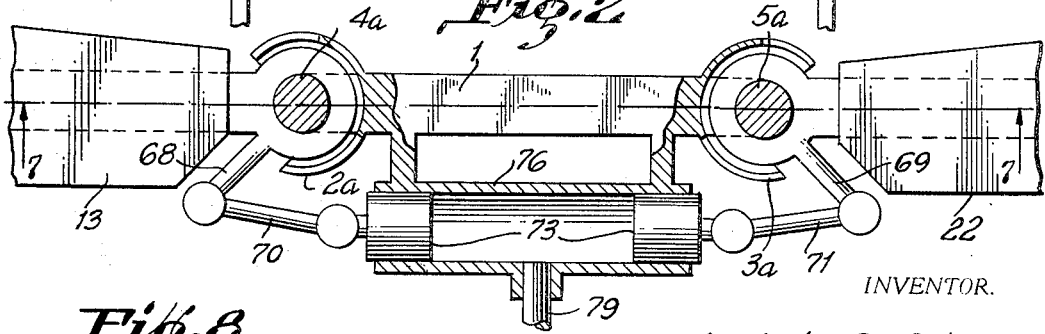

Referring now to the modified form of the activating control means for airfoils, which is illustrated in the FIGURES 7, 8, and 9, the numeral 1 indicates the wide rectangular frame or yoke form described in the first embodiment, and is for mounting of the wing means. This yoke 1 has formed with it or securely affixed to it six pairs of bearing fixtures, 2a on one side of the yoke 1 and 3a on the other side of the yoke 1. The three pairs of bearings on one side are substantially aligned axially each with the others, and likewise the three pairs of bearings on the other side of yoke 1 are substantially aligned axially each with the others, and these pairs are comparatively widely separated vertically. The three pairs of bearings on the other side and having their axes aligned are so positioned as to the axis of alignment, that the top end of the aligned three axes is a few degrees, say 10 to 20 degrees rearwardly, or more, in the circumference of a circle which would have the lower end of the aligned axes as a center; that is the aligned axes, regarded as one extended axis is inclined rearwardly at the top end in a plane which is parallel to the longitudinal axis of the aircraft fuselage and passes through the aligned axes. The three pairs of bearings at the other side of the fuselage are stationed similarly so that their aligned axes are similarly inclined at their top end (axially) in the plane at that side of the fuselage and parallel to the said longtiudinal axis. Thus the bearing axes at each side have the same inclination and the spar pivots (otherwise denoted wing support pivots designated each as 4a on one side and 5a on the opposite side are oscillatively mounted in the bearings described so that they and the spars designated 9, 10, 11 on one side and 12, 13, 14 on the other side, will have oscillation and inclination in similar manner as has been described in connection with the first form described. In this modified form there are the three separate or individual spar pivots on each side of the fuselage structure, so that the wing spars on either side are individually oscillative by their pivots.

Each wing spar on one side has an attached crank arm at its hub, the crank arms being designated each as 68 and the wing spars at the other side of the fuselage structure each has at its hub, a crank arm designated each as 69. Connecting rods 70 at one side and 71 at the other side connect the crank arms individually with servo-pistons of which there are three pairs, one pair 72—72, another 73—73, and another 74—74. Thus there are three pairs of servo-pistons, one in cylinder 75, one in cylinder 76, one in cylinder 77, and each pair of servo-pistons may operate as a pair in the cylinder, to move opposite in one phase moving away from each other, and in another phase moving toward each other, according to whether or not there is fluid pressure in the associated cylinder. The cylinders 75, 76, 77 have individual supply-release pipes 78, 79, 80, whereby there may be flow to or release from any of the cylinders 75, 76, 77, as hereinafter described.

The flow or release of fluid pressure to any of the cylinders 75, 76, 77, is controlled as is diagrammatically illustrated in FIGURE 9, wherein there are fluid supply 81 (gaseous or liquid or air), fluid pressure pump (compressor) 82, electric motor 83 driving the pump-compressor, fluid pressure pipe 84, control valves 85 (one for each supply release pipe 78, 79, 80), control release valves 86 (one for each supply-release pipe 78, 79, 80), release return pipe 87 by which the fluid pressure may be released back to fluid supply 81.

By the control as shown in FIGURE 9, the pilot may cause pressure flow to all the cylinders 75, 76, 77, by closing valves 86 and opening valves 85 and causing motor 83 to drive compressor-pump 82; or alternatively he may cause release fluid pressure by closing valves 85, and opening release valves 86. In one control condition the servo-pistons will move apart and cause airfoils of this unit A1 to be extended widely, and in the other condition the servo-pistons will or may move in each cylinder toward each other and permit the airfoils to trail and assume trailing positions, which they will automatically do in flight, when released, thusly, as the pressure of flow of ambient air will so compel the airfoils to move to trailing locations.

The fluid pressure system described may be effective to impel the airfoils of the unit A1 by simultaneous movement of all of the six airfoils as shown in FIGURE 7 so that they simultaneously move into the widely extended positions where they would be placed substantially at right angles to the longitudinal direction of flight, or alternatively may be permitted to retrograde rearwardly into the deeply swept wing positions. As an alternative use of the fluid pressure system of control, the pilot, by any control means or by any automatic means of control, may cause the airfoils of the unit A1 to be successively moved in pairs—the top pair, the intermediate pair, the lowermost pair—so that the pairs are successively moved to the extended positions or the trailing positions, according to the immediate need for either movement. It should be noted, however, that each pair of airfoils will, by the fluid pressure movement, have such unitary movement that the two airfoils of a pair move simultaneously in like movement or location, that is the extended locations or the trailing locations. This result is obtained since the pair of pressure pistons is in one cylinder according to the pressure or lack of pressure in the space between the pair of pistons in the single cylinder.

Referring to FIGURE 5 the fluid pressure cylinder with its pair of pistons is shown as having connection to move the oppositely located airfoil spars, and it should be noted that the shafts, here designated 43 and 43, are rotationally connected with a plurality of airfoil spars, those on one side and those on the other side. Thus the pistons in the single cylinder shown in FIGURE 5 control and move for oscillation all the airfoils of this unit B.

FIGURE 10 illustrates the fluid pressure control which may be used for each of the units B and C, that is one such control for B and one for C, there being valves and pump-compressor supply of fluid under pressure, such as is shown in FIGURE 9.

I have used the word super-imposed in descriptions and in claims, it being the intention thereby merely to designate locations or positions of sustentation elements as being in substantially vertical alignment disposed one after another in substantially vertical direction, these sustentation elements being however spaced apart in the one above another alignment vertically. That is such elements are by their definition contemplated to be so spaced apart that there may be relatively large and vertically thick current flow of ambient air between any adjoining pair of such elements. The invention is contemplated to be useful in any size of aircraft and power arrangement but most favorably in the very large and very high speed aircraft, especially for long distance transport, of any kind. In such use, in the normal cruising or travel speeds which may be supersonic, the current flow of ambient air between adjoining elements of the sustentation means is so large and so very rapid that there is high compression of air and relatively slow displacement of the air flow, so that there is great and very strong pressure effect on the airfoil elements with effectiveness and great efficiency in the utilization of the multiple number of vertically aligned elements. The vertical alignment is not necessarily perpendicular to the direction of flight but is near that. It is contemplated that "motor means" and its use may include any impulse producing means, as electric, hydraulic, pneumatic or turbine powered means. While I have shown particular devices and combinations of devices I contemplate that other detailed devices and combinations of devices may be used in the realization of my invention without departing from the spirit and contemplation and understanding thereof.

In the foregoing specification the members designated 9, 10, 11 are main wing spars on one side of the fuselage and the members designated 18, 19, 20 are main wing spars on the opposite side of the fuselage, these spar members are covered with the skins or sheaths which are designated 12, 13, 14 on one side and 21, 22, 23 on the other side of the fuselage. These elements are the main wings of the aircraft and are designated as "wings" or "main wings" in the appended claims. As shown in FIGURES 1 and 4 and other similar figures, these main wings are located in pairs called wing units, each of which is constituted by one wing as described on one side and one on the other side of the fuselage, which pair of wings are substantially in the same plane horizontally of the aircraft, and there are thus, as illustrated, three wing units, these wing units being super-imposed substantially vertically but spaced apart so that there is a vertically high and large volume space between the adjacent wing units, so that there may be air flow between each adjoining two wings, the air flow being accordingly of large volume in vertical cross section.

The units B and C, FIGURES 3 and 4 (and other figures) are for distinction designated as airfoils as to individual foils and airfoil units as to pairs of airfoils, that is such as are in the same plane vertically or horizontally. Such units as B and C are otherwise designated as flight control airfoils or airfoil units.

What I claim is:

1. In an aircraft: a fuselage having a structural frame longitudinally thereof; a sustentation means for the aircraft comprised of a plural number of wing units, each wing unit consisting of a pair of wings pivotably mounted on the structural frame in co-planar relation, each wing to be rotational within pre-determined limits for variable divergence in the wing planform plane about a pivot axis; a pivot bearing support means by which the wings of each wing unit are each rotatably supported at one end by the pivot bearing support means, the pivot bearing means having fixture on the structural frame; a motor means and a transmission connection between the motor means and the wings of each wing unit whereby the motor means may in movement impel the wings to have rotation divergence changing movement on the pivot bearing support means to place the wings of each wing unit in laterally extended formation for slow speed flight and whereby the wings may for an alternative condition of flight have rotation movement on the pivot bearing support means to place the wings of each of the wing units in a swept-back formation for high speed flight of the aircraft; said plural number of wing units being substantially vertically super-imposed and spaced apart rearwardly of said structural frame to in flight permit free flow of atmospheric air in space above and also in space below each wing of each wing unit.

2. The means as defined in claim 1: the rotation movement of the wings by the motor means being additionally defined as in either rotation movement to be a simultaneous movement for all wings of each wing unit.

3. The means as defined in claim 1 and: the motor means and transmission connection and the pivot bearing support means having such operative structure that in the one formation the wings of the wing units are extended in substantially parallel positions vertically spaced a plural number on one side of the pivot bearing support means and a like number on the other side of the pivot bearing support means, the wings on one side having a wide degree divergence with those on the other side, the wings having thereby a wide degree of divergence with the longitudinal flight direction; and so that in the alternative formation the wings on either side are extended in substantially parallel positions vertically spaced and at a lesser degree of divergence to the longitudinal flight direction; the first named formation being that for slow speed flight and the second named formation being that for high speed flight.

4. The means as defined in claim 1 and: the pivot bearing support means including a pair of common shaft means each being rotatable in the pivot bearing support means, one common shaft means by which a plural number of wings on one side of the longitudinal axis of the aircraft are relatively parallel and vertically super-imposed and spaced, the other common shaft means by which a plural number of wings on the other side of the longitudinal axis of the aircraft are supported relatively parallel each to the other vertically super-imposed and spaced and including operative connection between the common shaft means to effect rotation movement for either formation in unison.

5. The means as defined in claim 1 and: the motor means and the transmission connection being further defined as including fluid pressure responsive means for each wing unit of which one wing is at each opposite side of the longitudinal flight direction, and pressure fluid supply means to be effective in the fluid pressure responsive means of each of the wing units according to control means for the fluid pressure supply means.

6. The means as defined in claim 1 and: the pivot bearing support means including a pair of common shaft means each being rotatable in the pivot bearing support means, one of such common shaft means supporting a plural number of wings to be relatively parallel and vertically super-imposed and spaced, the other of such common shaft means supporting a plural number of wings to be relatively parallel and vertically super-imposed and spaced; the motor means and the transmission connection including fluid pressure responsive means effective through the transmission connection upon each of such pair of common shafts to impel the wings of one common shaft and the wings of the other common shaft means in movements divergently away from the intermediate longitudinal axis of flight; and means associated with said fluid pressure responsive means to permit all of such wings to have movement convergently to swept back locations.

7. In an aircraft: a structural fuselage frame; a plural number of wing units located on the fuselage to be in substantially vertically super-imposed relation and spaced apart; a transverse vertical frame secured to the structural fuselage frame and to be substantially transversely thereof and to have in the approximately vertical plane pivot bearings supported thereby and in which pivot means are rotationally mounted and to which pivot means the wings of each wing unit are each attached at one of their ends each unit pair of wings to be pivotable in substantially the same approximately horizontal plane; motor means by which wings of each unit are activated for movement about their pivoting axes; and control means for the motor means to procure formation of each wing unit so that its wings are widely divergent for sustentation at relatively slow speed or alternatively for formation of each wing unit so that its wings are in position of lesser divergence for sustentation at relatively high speed.

8. The means as defined in claim 7: the actuation movement of the wings of wing units by the motor means being additionally defined as in either divergence changing movement to be a simultaneous movement for all wings of each wing unit.

9. The means as defined in claim 7 and: the formation changing means and the pivot bearing support means having such operative structure that in the one formation the associated wings of the wing units are extended in substantially parallel positions vertically spaced a plural number on one side of the pivot bearing support means and a like number on the other side of the pivot bearing support means, the wings on one side having a wide degree of divergence with those on the other side, the wings thereby having a wide degree of divergence with the longitudinal flight direction; and so that in the alternative formation the wings on either side are extended in substantially parallel positions vertically spaced and at a lesser degree of divergence to the longitudinal flight direction; the first named formation being that for slow speed flight and the second named formation being that for high speed flight.

10. The means as defined in claim 7 and: a plural number of tail-plane units each including a plane segment on one side of the fuselage longitudinal axis and a plane segment on the other side of the fuselage longitudinal axis; said tail-plane units being substantially vertically super-imposed and spaced apart for air flow space between tail-planes; said tail-plane units and said first named wing units having relative mounting on the structural longitudinal frame so that the first named wing units, when in swept-back formation, integrate each with one tail-plane unit.

11. The means as defined in claim 7 and: the said motor means and transmission means being further defined as a plural number of cylinders associated one with each wing unit, each cylinder having a pair of pistons reciprocable therein and moving oppositely, each pair of pistons having transmission connection with the associated wing unit so that one piston transmits formation movement to one associated wing of the associated wing unit, and the other piston transmits formation movement to the other associated wing of the wing unit; the said control means for the motor means and a pressure fluid supply therefor enabling pressure fluid actuation of the pistons of each wing unit, to, under control of the control means, procure formation movement of the wing units.

12. An aircraft for translational flight: comprising main flight sustentation means and including in combination flight control air foil structure, such structure including at least two air foils each having pivotable bearing in the flight control air foil structure whereby the air foils thereof may be adjusted to widely divergent positions in the arc about the axis in the pivotable bearing or to closely adjacent positions in said arc, to provide for variable impact of ambient air flow in flight; and in combination the said flight control air foil structure having guidance pivoting in the aircraft structure for aircraft guidance adjustment; said flight control air foil structure being further defined as including a pivotable mounting for the flight control air foil structure whereby it has pivotable mounting on the aircraft to be pivotable as a unit on a horizontal axis which is transversely of the aircraft and controllable motor means therefor to provide for variable impact effect of ambient air on the air foil structure.

References Cited

UNITED STATES PATENTS

| | | | |
|---|---|---|---|
| 1,466,551 | 8/1923 | Thurston | 244—43 |
| 1,888,418 | 11/1932 | Adams | 244—43 |
| 2,683,574 | 7/1954 | Peterson | 244—46 |
| 2,744,698 | 5/1956 | Baynes | 244—46 X |
| 2,752,110 | 6/1956 | Peterson | 244—43 |
| 3,064,928 | 11/1962 | Toll | 244—46 |
| 3,218,005 | 11/1965 | Calderon | 244—43 |

MILTON BUCHLER, Primary Examiner

J. L. FORMAN, Assistant Examiner